US012594789B2

(12) United States Patent
Oizumi

(10) Patent No.: US 12,594,789 B2
(45) Date of Patent: Apr. 7, 2026

(54) TIRE

(71) Applicant: THE YOKOHAMA RUBBER CO., LTD., Kanagawa (JP)

(72) Inventor: Naoya Oizumi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 22 days.

(21) Appl. No.: 18/254,806

(22) PCT Filed: Nov. 12, 2021

(86) PCT No.: PCT/JP2021/041777
§ 371 (c)(1),
(2) Date: May 26, 2023

(87) PCT Pub. No.: WO2022/118638
PCT Pub. Date: Jun. 9, 2022

(65) Prior Publication Data
US 2024/0278601 A1 Aug. 22, 2024

(30) Foreign Application Priority Data

Dec. 2, 2020 (JP) ................................. 2020-200605
Aug. 26, 2021 (JP) ................................. 2021-138070

(51) Int. Cl.
B60C 11/03 (2006.01)
B60C 11/12 (2006.01)

(52) U.S. Cl.
CPC ...... B60C 11/0304 (2013.01); B60C 11/1204 (2013.01); B60C 11/1281 (2013.01);
(Continued)

(58) Field of Classification Search
CPC ............. B60C 11/1281; B60C 11/0304; B60C 2011/0348; B60C 2011/0351; B60C 2011/0381; B60C 2011/0383
See application file for complete search history.

(56) References Cited

U.S. PATENT DOCUMENTS

2016/0144665 A1* 5/2016 Koishikawa ........ B60C 11/0302
152/209.1
2019/0001753 A1 1/2019 Hayashi
(Continued)

FOREIGN PATENT DOCUMENTS

DE 10 2016 219 967 A1 4/2017
DE 11 2017 007 076 T5 10/2019
(Continued)

OTHER PUBLICATIONS

JP 2005-075213 Machine Translation, Nakajima, Takehiko (Year: 2005).*

*Primary Examiner* — Justin R Fischer
*Assistant Examiner* — Nicholas J Weiler
(74) *Attorney, Agent, or Firm* — Thorpe North & Western

(57) ABSTRACT

A tire includes a first shoulder land portion, a first circumferential groove, a first middle land portion, a second circumferential groove, a center land portion, a third circumferential groove, a second middle land portion, a fourth circumferential groove, and a second shoulder land portion in this order from a vehicle mounting inner side in a tire plan view. The center land portion includes a plurality of center sipes extending in a tire width direction. At least one of the plurality of center sipes includes a chamfered portion at at least any of one and the other edge portions in a tire circumferential direction. The first middle land portion includes a plurality of middle sipes extending in the tire width direction. At least one of the plurality of middle sipes includes a chamfered portion at at least any of one and the other edge portions in the tire circumferential direction.

14 Claims, 6 Drawing Sheets

(52) U.S. Cl.
CPC ................. *B60C 2011/0348* (2013.01); *B60C 2011/0381* (2013.01)

(56) References Cited

U.S. PATENT DOCUMENTS

| | | | | |
|---|---|---|---|---|
| 2021/0188013 A1* | 6/2021 | Morito | ................ | B60C 11/1259 |
| 2022/0048331 A1* | 2/2022 | Matsushita | ......... | B60C 11/0304 |

FOREIGN PATENT DOCUMENTS

| | | | | | |
|---|---|---|---|---|---|
| JP | 2005075213 A | * | 3/2005 | | |
| JP | 2015-231812 A | | 12/2015 | | |
| JP | 2016-203703 A | | 12/2016 | | |
| JP | 2017-24658 A | | 2/2017 | | |
| JP | 2017-56814 A | | 3/2017 | | |
| JP | 2017-124713 A | | 7/2017 | | |
| JP | 2018-154147 A | | 10/2018 | | |
| JP | 2018-154189 A | | 10/2018 | | |
| JP | 2019-1232 A | | 1/2019 | | |
| JP | 2019-119279 A | | 7/2019 | | |
| JP | 2019-182145 A | | 10/2019 | | |
| JP | 2019-209873 A | | 12/2019 | | |
| WO | WO-2017141651 A1 | * | 8/2017 | ......... | B60C 11/0304 |
| WO | 2018/047819 A1 | | 3/2018 | | |
| WO | WO-2020153011 A1 | * | 7/2020 | ......... | B60C 11/0302 |

* cited by examiner

TIRE

TECHNICAL FIELD

The present technology relates to a tire.

BACKGROUND ART

In the related art, since there is a tendency that tire noise regulations are strengthened in a snow tire as well similarly to other tires, a technology for improving noise performance while maintaining snow performance (for example, due to lateral acceleration) has been proposed (for example, Japan Unexamined Patent Publication No. 2019-119279 A). Japan Unexamined Patent Publication No. 2019-119279 A describes a tire including a center land portion, middle land portions, and shoulder land portions defined by four main grooves on a surface of a tread portion, and each land portion has sipes. In the tire of Japan Unexamined Patent Publication No. 2019-119279 A, the sipes provided in the region of the center land portion open to an inner circumferential main groove to reduce the rigidity of the region of the center land portion in the vicinity of the inner circumferential main groove, thereby improving noise performance.

In the tire described in Japan Unexamined Patent Publication No. 2019-119279 A, particularly when the height of the land portion is large at the initial stage of mounting, there is a possibility that an intended edge effect cannot be obtained due to the land portion flexing in a ground contact surface and the edges of the sipes coming into contact with one another.

SUMMARY

The present technology has been made in view of the circumstances above, and the present technology provides a tire having improved snow performance without deteriorating noise and vibration performance.

A tire according to an embodiment of the present technology may have a pattern asymmetric with respect to a tire equatorial plane in a tire plan view. The tire may include a first shoulder land portion, a first circumferential groove, a first middle land portion, a second circumferential groove, a center land portion, a third circumferential groove, a second middle land portion, a fourth circumferential groove, and a second shoulder land portion in this order from a vehicle mounting inner side. The center land portion may include a plurality of center sipes extending in a tire width direction. At least one of the plurality of center sipes may include a chamfered portion at at least any of one and the other edge portions in a tire circumferential direction. The first middle land portion may include a plurality of middle sipes extending in the tire width direction. At least one of the plurality of middle sipes may include a chamfered portion at at least any of one and the other edge portions in the tire circumferential direction.

In the tire according to an embodiment of the present technology, at least one of the center sipe and the middle sipe has the chamfered portion. Therefore, with the tire according to an embodiment of the present technology, the tire having improved snow performance can be provided without deteriorating noise and vibration performance.

DETAILED DESCRIPTION

Hereinafter, tires according to embodiments of the present technology (Basic Embodiment and Additional Embodiments 1 to 12 described later) will be described in detail with reference to the drawings. The present technology is not limited to these embodiments. Furthermore, constituents of the embodiment include elements that can be substituted or easily conceived by one skilled in the art or that are essentially identical. In addition, the various modes included in the embodiments can be combined as desired within the scope of obviousness by one skilled in the art.

Basic Embodiment

A tire according to Basic Embodiment of the present technology will be described below. In the following description, a tire radial direction refers to a direction orthogonal to a rotation axis of the tire, an inner side in the tire radial direction refers to a side toward the rotation axis in the tire radial direction, and an outer side in the tire radial direction refers to a side away from the rotation axis in the tire radial direction. In addition, a tire circumferential direction refers to a circumferential direction about the rotation axis as a center axis. Moreover, a tire width direction refers to a direction parallel to the rotation axis, an inner side in the tire width direction refers to a side toward a tire equatorial plane (tire equator line) in the tire width direction, and an outer side in the tire width direction refers to a side away from the tire equatorial plane in the tire width direction. A tire equatorial plane CL refers to a plane that is orthogonal to the rotation axis of the tire and passes through the center of the tire width of the tire. Note that each groove and each sipe "extending in the tire width direction" is not limited to a case of extending in a direction parallel to the tire width direction, but includes a case of being inclined at an angle of less than 45° to one side and the other side in the tire circumferential direction with respect to the tire width direction.

Figure 1:
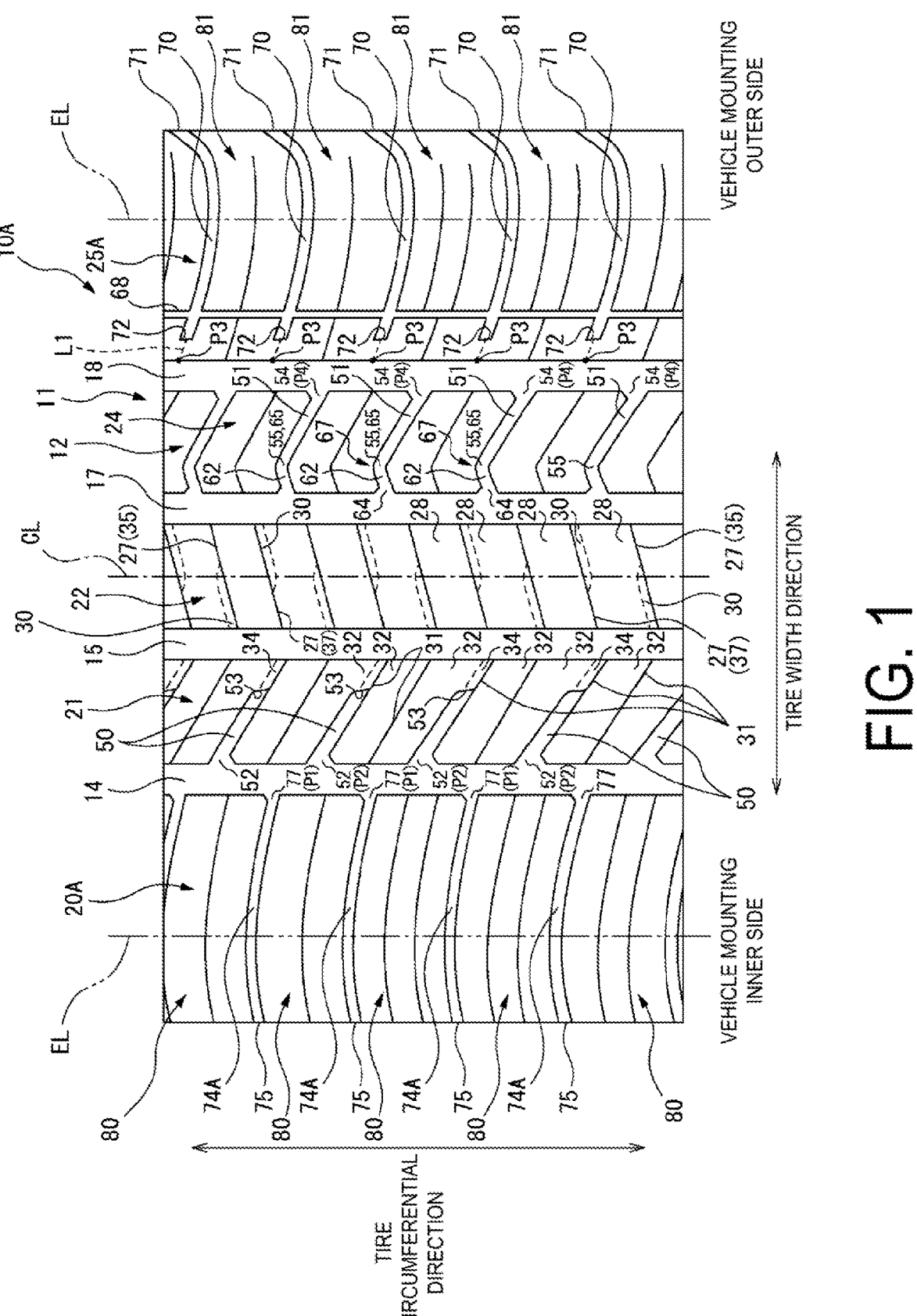
FIG. 1 is a plan view illustrating an example of a tread surface of a tire according to the present embodiment.

A tire 10A illustrated in FIG. 1 includes a tread portion 11 on the outer side in the tire radial direction. The tread portion 11 is made of a rubber material (tread rubber). The tread portion 11 has a tread surface 12 that comes into contact with a road surface while a vehicle is traveling. The tread surface 12 has an annular shape and a predetermined length in the tire width direction, and is continuous in the tire circumferential direction. A tread pattern with a predetermined design is formed in the tread surface 12. The tread pattern is asymmetrical with respect to the tire equatorial plane CL between both sides of the tire equatorial plane CL in the tire width direction. A reference sign EL in FIG. 1 indicates a ground contact edge line (a line along which continuous ground contact edges are connected in the tire circumferential direction).

As illustrated in FIG. 1, in the tire 10A according to the present embodiment, at least four circumferential grooves, that is, a first circumferential groove 14, a second circumferential groove 15, a third circumferential groove 17, and a fourth circumferential groove 18 are provided in this order from a vehicle mounting inner side (the left side in FIG. 1) in the tread surface 12. The four circumferential grooves extend in the tire circumferential direction. The four circumferential grooves define and form five land portions, that is, a first shoulder land portion 20A, a first middle land portion 21, a center land portion 22, a second middle land portion 24, and a second shoulder land portion 25A in this order from the vehicle mounting inner side in the tread surface 12. The tire 10A includes the first shoulder land portion 20A, the first circumferential groove 14, the first middle land portion 21, the second circumferential groove 15, the center land portion 22, the third circumferential groove 17, the second middle land portion 24, the fourth circumferential groove 18, and the second shoulder land portion 25A in this order from the vehicle mounting inner side in the tread surface 12.

The first shoulder land portion 20A is disposed between a position on the outer side in the tire width direction with respect to a ground contact edge on the vehicle mounting inner side and the first circumferential groove 14. The first middle land portion 21 is disposed between the first circumferential groove 14 and the second circumferential groove 15. The center land portion 22 is disposed between the second circumferential groove 15 and the third circumferential groove 17. The second middle land portion 24 is disposed between the third circumferential groove 17 and the fourth circumferential groove 18. The second shoulder land portion 25A is disposed between the fourth circumferential groove 18 and a position on the outer side in the tire width direction with respect to the ground contact edge on a vehicle mounting outer side (the right side in FIG. 1).

Under such a premise, in the tire 10A according to Basic Embodiment, the center land portion 22 includes a plurality of center sipes 27 extending in the tire width direction in a tire plan view. In the tire 10A according to Basic Embodiment, the first middle land portion 21 includes a plurality of middle sipes 31 extending in the tire width direction.

Figure 2A:
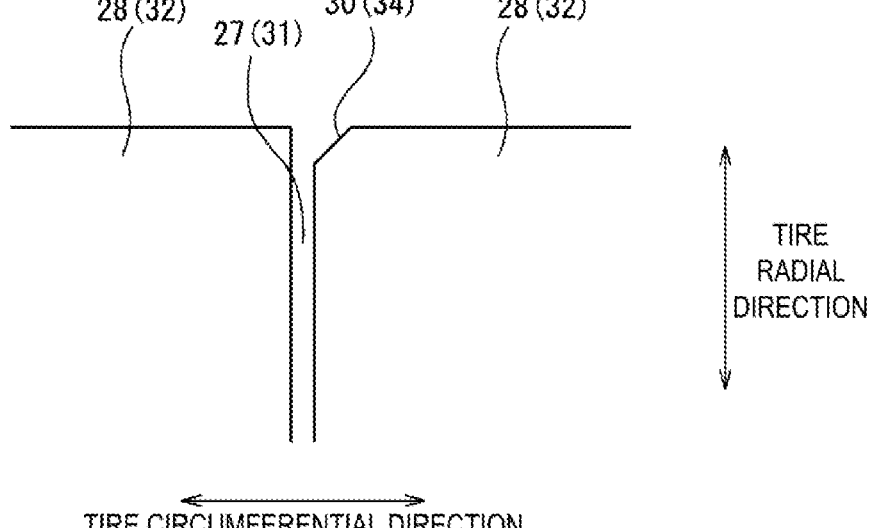
FIG. 2A is a cross-sectional view illustrating an unloaded state of center blocks (or middle blocks) adjacent to one another in a tire circumferential direction.

The center sipe 27 may be linear or non-linear. The center sipe 27 may be inclined to one side in the tire circumferential direction with respect to the tire width direction. Respective portions of the center land portion 22 disposed on both sides in the tire circumferential direction with the center sipe 27 interposed therebetween are referred to as center blocks 28. At least one of the center sipes 27 has a chamfered portion 30 at at least any of one and the other edge portions in the tire circumferential direction. As illustrated in FIG. 2A, the chamfered portion 30 may be formed only at one or the other edge portion of the center sipe 27 in the tire circumferential direction.

The middle sipe 31 may be linear or non-linear. The middle sipes 31 may be inclined to one side in the tire circumferential direction with respect to the tire width direction. Respective portions of the first middle land portions 21 disposed on both sides with the middle sipe 31 interposed therebetween are referred to as middle blocks 32. The middle sipes 31 illustrated in FIG. 1 are inclined to a side opposite to the center sipes 27 in the tire circumferential direction with respect to the tire width direction. At least one of the plurality of middle sipes 31 has a chamfered portion 34 at at least any of one and the other edge portions in the tire circumferential direction. As illustrated in FIG. 2A, the chamfered portion 34 may be formed only at one or the other edge portion of the middle sipe 31 in the tire circumferential direction.

Hereinafter, a case where the tire 10A is a pneumatic tire will be described in detail. That is, an example of a dimension of each groove of the pneumatic tire in which the tire is mounted on a specified rim, inflated to an internal pressure 5% of a specified internal pressure, and in an unloaded state is described. For example, in a tire having a size 235/60R18, the groove widths of the four circumferential main grooves are from 6 mm to 14 mm, the depths thereof are from 6.0 mm to 10.0 mm, and the intervals therebetween are from mm to 40 mm. The groove widths of the four circumferential main grooves may be the same as or differ from one another. The groove widths of the center sipe 27 and the middle sipe 31 are from 0.5 mm to 1.5 mm, and the intervals therebetween are from 3 mm to 20 mm. The depths of the center sipe 27 and the middle sipe 31 may be shallower than the depths of the four circumferential grooves. Depths Dc of the center sipe 27 and the middle sipe 31 are expressed by $0.4 \times Dm \leq Dc \leq 0.9 \times Dm$, where Dm is the depths of the four circumferential grooves. The depth of the chamfered portion is from 0.6 mm to 2.0 mm, and the widths thereof is from 1.0 mm to 4.0 mm. In the present specification, the groove width is the maximum dimension in a direction perpendicular to an extension direction of the groove, and the depths of the sipe and the groove are the maximum dimensions measured from a tire profile to a sipe bottom and a groove bottom in the tire radial direction in the case of without a sipe or a groove (in a tire meridian cross-sectional view).

Here, "specified rim" refers to an "applicable rim" defined by the Japan Automobile Tyre Manufacturers Association (JATMA), a "Design Rim" defined by the Tire and Rim Association (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by the TRA, or to "INFLATION PRESSURES" defined by the ETRTO.

Effects

Figure 2B:
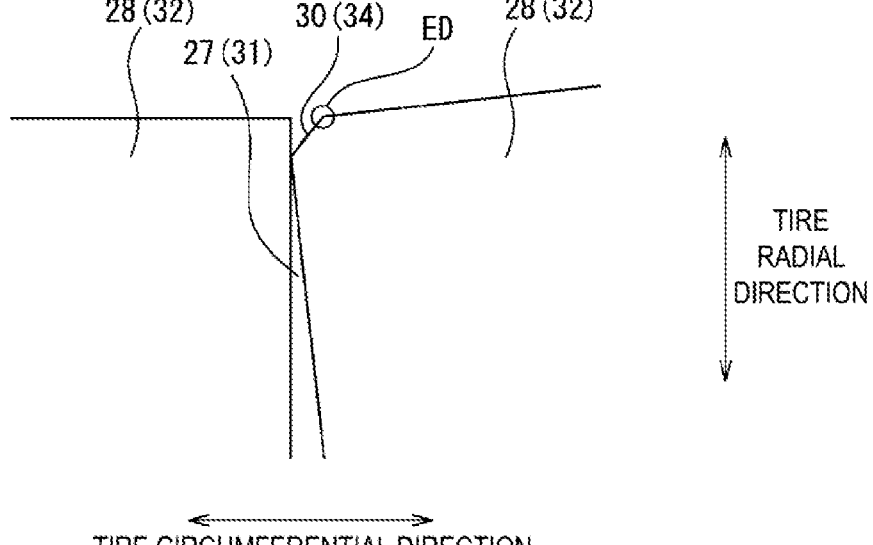
FIG. 2B is a cross-sectional view illustrating a use state (loaded state) of the center blocks (or the middle blocks) adjacent to one another in the tire circumferential direction.

In the tire 10A according to Basic Embodiment, as illustrated in FIG. 2B, the center blocks 28 disposed with the center sipe 27 interposed therebetween flex in the tire circumferential direction due to a load received from a road surface on a ground contact surface. In particular, when the depth of the center sipe 27 is deep (when the height of the center block 28 is high), one center block 28 comes into contact with the other center block 28 with the center sipe 27 interposed therebetween. When the center blocks 28 come into contact with one another, an edge ED of the chamfered portion 30 provided in any one of a pair of edges facing one another with the center sipe 27 interposed therebetween comes into contact with a road surface.

Similarly, in the tire 10A, when the middle blocks 32 disposed with the middle sipe 31 interposed therebetween come into contact with one another, the edge ED of the chamfered portion 34 provided in any one of a pair of edges facing one another with the middle sipe 31 interposed therebetween comes into contact with a road surface.

As described above, when the center blocks 28 and the middle blocks 32 flex and come into contact with one another, the edges ED of the chamfered portions 30, 34 come into contact with a road surface. As a result, in the tire 10A according to FIG. 1, even when the heights of the center block 28 and the middle block 32 are high, intended traction performance is ensured by the edges EDs of the chamfered portions 30, 34, and thus superior snow performance during braking and driving can be obtained.

In the tire 10A according to Basic Embodiment, by providing the chamfered portion 30, 34 in at least one of the center sipe 27 and the middle sipe 31 as described above, snow performance can be improved without increasing the groove area. That is, in the tire 10A, by providing the chamfered portion 30, 34 in at least one of the center sipe 27 and the middle sipe 31, snow performance can be improved compared with other tires having the same groove area. Since the groove area of the tire 10A is hardly increased compared with the conventional tire, it is possible to suppress the deterioration of noise and vibration performance.

As described above, in the tire 10A of Basic Embodiment, by providing the chamfered portion 30, 34 in at least one of the center sipe 27 and the middle sipe 31, it is possible to improve snow performance without deteriorating noise and vibration performance.

When the tire 10A according to Basic Embodiment described above is a pneumatic tire, the tire 10A has a meridian cross-section shape (not illustrated) similar to that of the conventional tire. Here, the meridian cross-section shape of the tire refers to the cross-sectional shape of the tire as it appears on a plane perpendicular to the tire equatorial plane CL. In the tire meridian cross-sectional view, the tire 10A according to Basic Embodiment includes bead portions, sidewall portions, shoulder portions, and a tread portion in that order from the inner side to the outer side in the tire radial direction. Also, in the tire meridian cross-sectional view, for example, the tire 10A includes a carcass layer extending from the tread portion to the bead portions on both sides and wound around a pair of bead cores, and a belt layer and a belt reinforcing layer provided in that order on the carcass layer on the outer side in the tire radial direction.

The tire 10A according to Basic Embodiment described above is obtained through ordinary respective manufacturing steps, that is, for example, a tire material mixing step, a tire material processing step, a green tire molding step, a vulcanization step, and an inspection step after vulcanization. To manufacture the tire 10A according to Basic Embodiment, for example, protrusion portions and recess portions corresponding to the tread pattern illustrated in FIG. 1 are formed in an inner wall of a vulcanization mold, and vulcanization is performed by using this mold.

The tire 10A of the present Basic Embodiment described above is particularly preferably a pneumatic tire, but tires other than pneumatic tires are also included in the scope of the present technology as long as the tires have the tread patterns illustrated in FIG. 1.

ADDITIONAL EMBODIMENTS

Additional Embodiments 1 to 12 that can optionally be embodied on Basic Embodiment described above of the tire according to an embodiment of the present technology will be described.

Additional Embodiment 1

Figure 3:
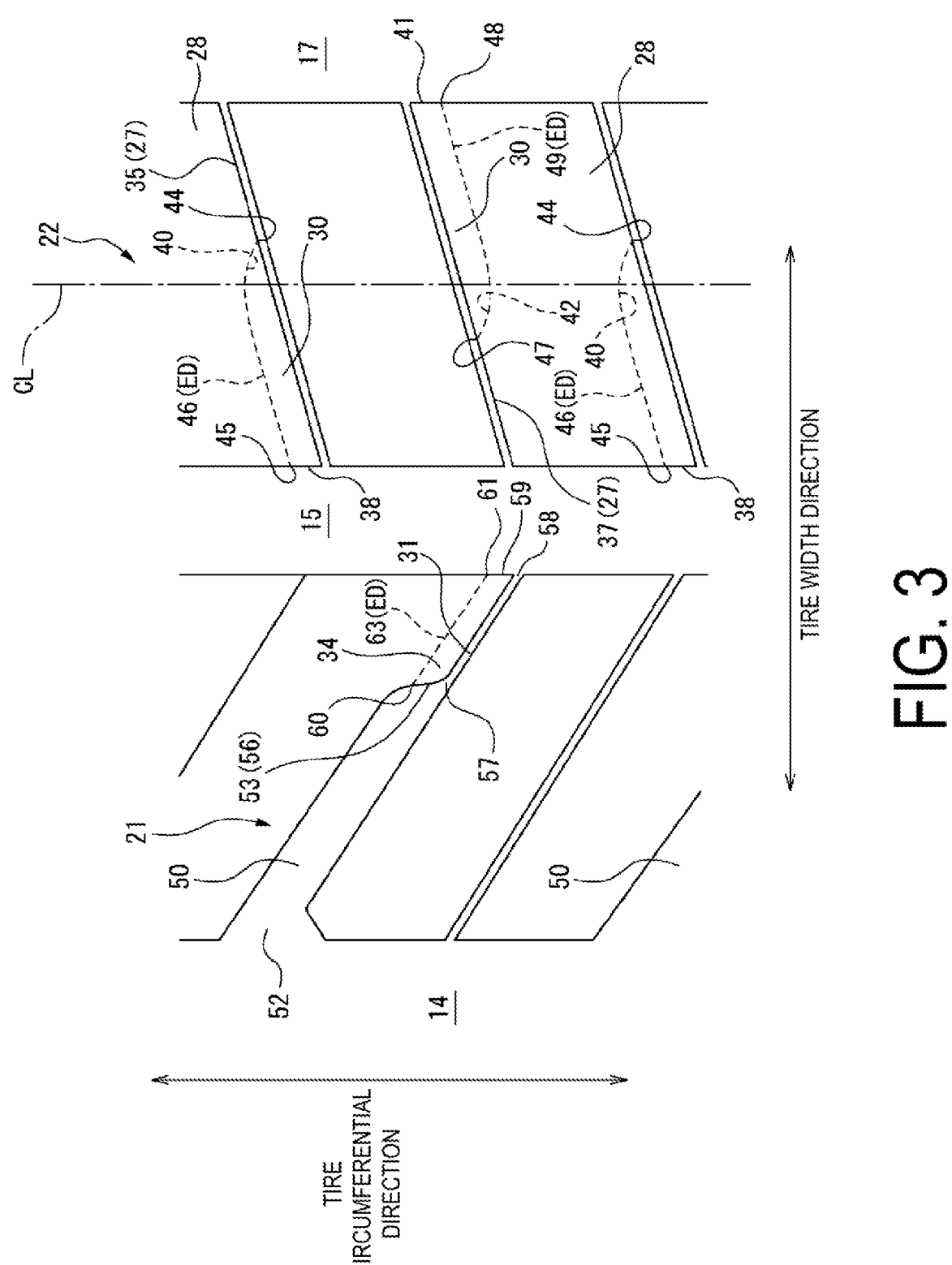
FIG. 3 is a partially enlarged view of the tread surface illustrated in FIG. 1.

In Basic Embodiment, as illustrated in FIG. 3, the center sipe 27 preferably includes a first center sipe 35 and a second center sipe 37. The first center sipe 35 has the chamfered portion 30 at one edge portion in the tire circumferential direction. The chamfered portion 30 of the first center sipe 35 has a base end 38 communicating with the second circumferential groove 15 and an end 40 disposed in the center land portion 22. The second center sipe 37 has the chamfered portion 30 at the other edge portion in the tire circumferential direction. The chamfered portion 30 of the second center sipe 37 has a base end 41 communicating with the third circumferential groove 17 and an end 42 disposed in the center land portion 22. The first center sipes 35 and the second center sipes 37 are alternately disposed in the tire circumferential direction. In the center land portion 22, the chamfered portion 30 is disposed point symmetrically with respect to the center point of each of the center blocks 28 in which the chamfered portion 30 is formed.

As illustrated in FIG. 3, the chamfered portion 30 of the first center sipe 35 has a ridgeline 46 including a top portion 44 and a top portion 45. The top portion 44 is formed at the end 40 of the chamfered portion 30 of the first center sipe 35 by the surface of the chamfered portion 30, the surface of the center land portion 22, and the side surface of the first center sipe 35. The top portion 45 is formed at the base end 38 of the chamfered portion 30 of the first center sipe 35 by the surface of the chamfered portion 30, the surface of the center land portion 22, and the side surface of the second circumferential groove 15. The ridgeline 46 is a boundary between the surface of the chamfered portion 30 and the surface of the center land portion 22 and is formed so as to connect the top portion 44 and the top portion 45. The ridgeline 46 is the edge ED of the chamfered portion 30 of the first center sipe 35. The ridgeline 46 extends from the top portion 45 in parallel with the first center sipe 35, is inclined in the tire circumferential direction from a position intersecting with the tire equatorial plane CL to the top portion 44, and is connected to the top portion 44.

As illustrated in FIG. 3, the chamfered portion 30 of the second center sipe 37 has a ridgeline 49 including a top portion 47 and a top portion 48. The top portion 47 is formed at the end 42 of the chamfered portion 30 of the second center sipe 37 by the surface of the chamfered portion 30, the surface of the center land portion 22, and the side surface of the second center sipe 37. The top portion 48 is formed at the base end 41 of the second center sipe 37 by the surface of the chamfered portion 30, the surface of the center land portion 22, and the side surface of the third circumferential groove 17. The ridgeline 49 is a boundary between the surface of the chamfered portion 30 and the surface of the center land portion 22 and is formed so as to connect the top portion 47 and the top portion 48. The ridgeline 49 is the edge ED of the chamfered portion 30 of the second center sipe 37. The ridgeline 49 extends from the top portion 48 in parallel with the first center sipe 35, is inclined in the tire circumferential direction from a position intersecting with the tire equatorial plane CL to the top portion 47, and is connected to the top portion 47.

The first center sipes 35 and the second center sipes 37 are alternately disposed in the circumferential direction, and thus the chamfered portion 30 is disposed point-symmetrically with respect to the center point of each of the center blocks 28 in which the chamfered portion 30 is formed. As a result, the tire 10A has the chamfered portions 30 at respective step-in side and kick-out side in the center land portion 22. Accordingly, the tire 10A allows improving the snow performance during braking and driving regardless of the rotation direction. By the chamfered portions 30 being alternately disposed in the tire width direction, the balance of the rigidity of the center land portion 22 in the tire width direction is enhanced.

Additional Embodiment 2

In Basic Embodiment or an embodiment in which Additional Embodiment 1 is added to Basic Embodiment, as illustrated in FIG. 1, the first middle land portion 21 preferably includes first middle grooves 50 extending in the tire width direction, and the second middle land portion 24 preferably includes second middle grooves 51 extending in the tire width direction. As illustrated in FIG. 3, the first middle groove 50 has a base end 52 communicating with the first circumferential groove 14 and an end 53 disposed at a position closer to the second circumferential groove 15 than the center of the first middle land portion 21 in the tire width direction. A proportion of the length of the first middle groove 50 in the tire width direction occupying the length of the first middle land portion 21 in the tire width direction may be greater than 50% and less than 80%. As illustrated in FIG. 1, the second middle groove 51 has a base end 54 communicating with the fourth circumferential groove 18 and an end 55 disposed at a position closer to the third circumferential groove 17 than the center of the second middle land portion 24 in the tire width direction. The end 55 of the second middle groove 51 may terminate within the second middle land portion 24 and need not communicate with the third circumferential groove 17. A proportion of the length of the second middle groove 51 in the tire width direction occupying the length of the second middle land portion 24 in the tire width direction may be greater than 50% and less than 80%.

Since the groove area increases by providing the predetermined first middle grooves 50 and second middle grooves 51, the tire 10A can ensure snow traction and improve snow performance during braking and driving. The first middle groove 50 and the second middle groove 51 have the ends 53 and 55 disposed in the first middle land portion 21 and the second middle land portion 24, respectively. That is, the first middle groove 50 does not directly communicate with the second circumferential groove 15, and the second middle groove 51 does not directly communicate with the third circumferential groove 17. Therefore, in the tire 10A, since pattern noise is not directly emitted to the outside of the vehicle from the second circumferential groove 15 or the third circumferential groove 17 through the first middle groove 50 or the second middle groove 51, it is possible to prevent deterioration of noise and vibration performance.

Additional Embodiment 3

In an embodiment in which Additional Embodiment 2 is added to Basic Embodiment, as illustrated in FIG. 3, it is preferable that at least one base end 57 of the plurality of middle sipes 31 communicates with the end 53 of the first middle groove 50 and an end 58 communicates with the second circumferential groove 15. One side surfaces of the respective first middle groove 50 and middle sipe 31 are disposed on the same line and are inclined to one side in the tire circumferential direction from the first circumferential groove 14 to the second circumferential groove 15. The width of the chamfered portion 34 of the middle sipe 31 is narrower than the groove width of the first middle groove 50.

One side surface of the first middle groove 50 in the tire circumferential direction is flush with one side surface of the middle sipe 31 in the tire circumferential direction. The middle sipe 31 has the chamfered portion 34 at the other edge portion facing in the tire circumferential direction one edge portion of the side surface in the tire circumferential direction. The chamfered portion 34 is formed continuously from the base end 57 to the end 58 of the middle sipe 31. A base end 56 of the chamfered portion 34 communicates with the first middle groove 50 and an end 59 communicates with the second circumferential groove 15.

As illustrated in FIG. 3, the chamfered portion 34 of the middle sipe 31 has a ridgeline 63 including a top portion 60 and a top portion 61. The top portion 60 is formed at the base end 56 of the chamfered portion 34 by the surface of the chamfered portion 34, the surface of the first middle land portion 21, and the surface of the end 53 of the first middle groove 50. The top portion 61 is formed at the end 59 of the chamfered portion 34 by the surface of the chamfered portion 34, the surface of the first middle land portion 21, and the side surface of the second circumferential groove 15. The ridgeline 63 is a boundary between the surface of the chamfered portion 34 and the surface of the first middle land portion 21 and is formed so as to connect the top portion 60 and the top portion 61. The ridgeline 63 is the edge ED of the chamfered portion 34 of the middle sipe 31. The ridgeline 63 extends parallel to the middle sipe 31.

Since the predetermined middle sipe 31 is interposed between the second circumferential groove 15 and the first middle groove 50, the second circumferential groove 15 does not directly communicate with the first middle groove 50. Pattern noise is attenuated by the pattern noise passing through the middle sipe 31 having an extremely small groove width from the second circumferential groove 15. Therefore, since the pattern noise emitted to the outside from the first middle groove 50 is reduced in the tire 10A, snow performance during braking and driving can be improved while deterioration of noise and vibration performance is prevented.

Additional Embodiment 4

In an embodiment in which Additional Embodiment 2 or 3 is added to Basic Embodiment, as illustrated in FIG. 1, the second middle land portion 24 preferably includes third middle grooves 62 communicating with the end of the second middle grooves 51. A base end 65 of the third middle groove 62 communicates with the end 55 of the second middle groove 51, and an end 64 of the third middle groove 62 communicates with the third circumferential groove 17. The second middle groove 51 is inclined to one side in the tire circumferential direction. The end 55 of the second middle groove 51 and the base end 65 of the third middle groove 62 form a communicating portion 67 protruding in the tire circumferential direction. The third middle groove 62 may be inclined in a direction different from the second middle groove 51 in the tire circumferential direction. The communicating portion 67 illustrated in FIG. 1 has an inverted V-shape. The third middle groove 62 may be inclined in the same direction as the second middle groove 51 in the tire circumferential direction. In this case, the communicating portion 67 has a regular V shape.

By providing the predetermined third middle groove 62, the groove area of the second middle land portion 24 is increased, and thus the snow performance during braking and driving can be improved. When pattern noise passes through the communicating portion 67 protruding in the tire circumferential direction, a part of the pattern noise is absorbed by the communicating portion 67 to attenuate. Therefore, the tire 10A having the communicating portions 67 can improve noise and vibration performance compared with a case where the communicating portion 67 is not provided and pattern noise is directly emitted to the outside of the vehicle, for example, a case where the second middle groove 51 communicates with the third circumferential groove 17 and the fourth circumferential groove 18 without the communicating portion 67.

Additional Embodiment 5

In Basic Embodiment or an embodiment in which at least any of Additional Embodiments 1 to 4 is added to Basic Embodiment, as illustrated in FIG. 1, the second shoulder land portion 25A preferably includes an outer auxiliary groove 68 extending in the tire circumferential direction and second shoulder grooves 70 extending in the tire width direction. An example of a dimension of each groove of the pneumatic tire in which the tire is mounted on a specified rim, inflated to an internal pressure 5% of a specified internal pressure, and in an unloaded state is described. For example, a depth Ds of the outer auxiliary groove 68 of a tire having a size 235/60R18 is expressed by $0.3 \times Dm \leq Ds \leq 0.8 \times Dm$, where Dm is the depths of the four circumferential grooves. A groove width Ws of the outer auxiliary groove 68 is expressed by $0.1 \times Wm \leq Ws \leq 0.4 \times Wm$ with respect to the groove widths Wm of the four circumferential grooves. When the groove widths of the four circumferential grooves differ, an average value of the groove widths of the four circumferential grooves may be used as the groove width Wm. The second shoulder groove 70 has a base end 71 positioned on the outer side in the tire width direction with respect to the ground contact edge on the vehicle mounting outer side and an end 72 disposed between the outer auxiliary groove 68 and the fourth circumferential groove 18. That is, the second shoulder groove 70) intersects with the outer auxiliary groove 68, terminates within the second shoulder land portion 25A, and does not communicate with the fourth circumferential groove 18.

By providing the predetermined outer auxiliary groove 68 and second shoulder grooves 70, the tire 10A increases the groove area of the second shoulder land portion 25A, and by combining the two grooves having different extension directions, snow traction in a turning direction can be ensured. Thus, the tire 10A allows improving snow performance during turning as well as during braking and driving. Although the groove area of the tire 10A increases by the outer auxiliary groove 68 and the second shoulder grooves 70, noise and vibration performance is not impaired because the second shoulder groove 70 does not communicate with the fourth circumferential groove 18.

Additional Embodiment 6

In Basic Embodiment or an embodiment in which at least any of Additional Embodiments 1 to 5 is added to Basic Embodiment, as illustrated in FIG. 1, the first shoulder land portion 20A preferably has first shoulder grooves 74A extending in the tire width direction. The first shoulder groove 74A has a base end 75 positioned on the outer side in the tire width direction with respect to the ground contact edge on the vehicle mounting inner side and an end 77 communicating with the first circumferential groove 14. That is, the first shoulder groove 74A communicates with the first circumferential groove 14.

By providing the predetermined first shoulder grooves 74A, the tire 10A can increase the groove area of the first shoulder land portion 20A and improve the snow performance during braking and driving. The first shoulder grooves 74A are formed in the first shoulder land portion 20A on the vehicle mounting inner side where the first shoulder groove 74A does not adversely affect noise and vibration performance. As a result, the tire 10A can suppress pattern noise emitted from the first shoulder groove 74A to the vehicle mounting outer side and prevent the deterioration of noise and vibration performance.

Additional Embodiment 7

Figure 4:
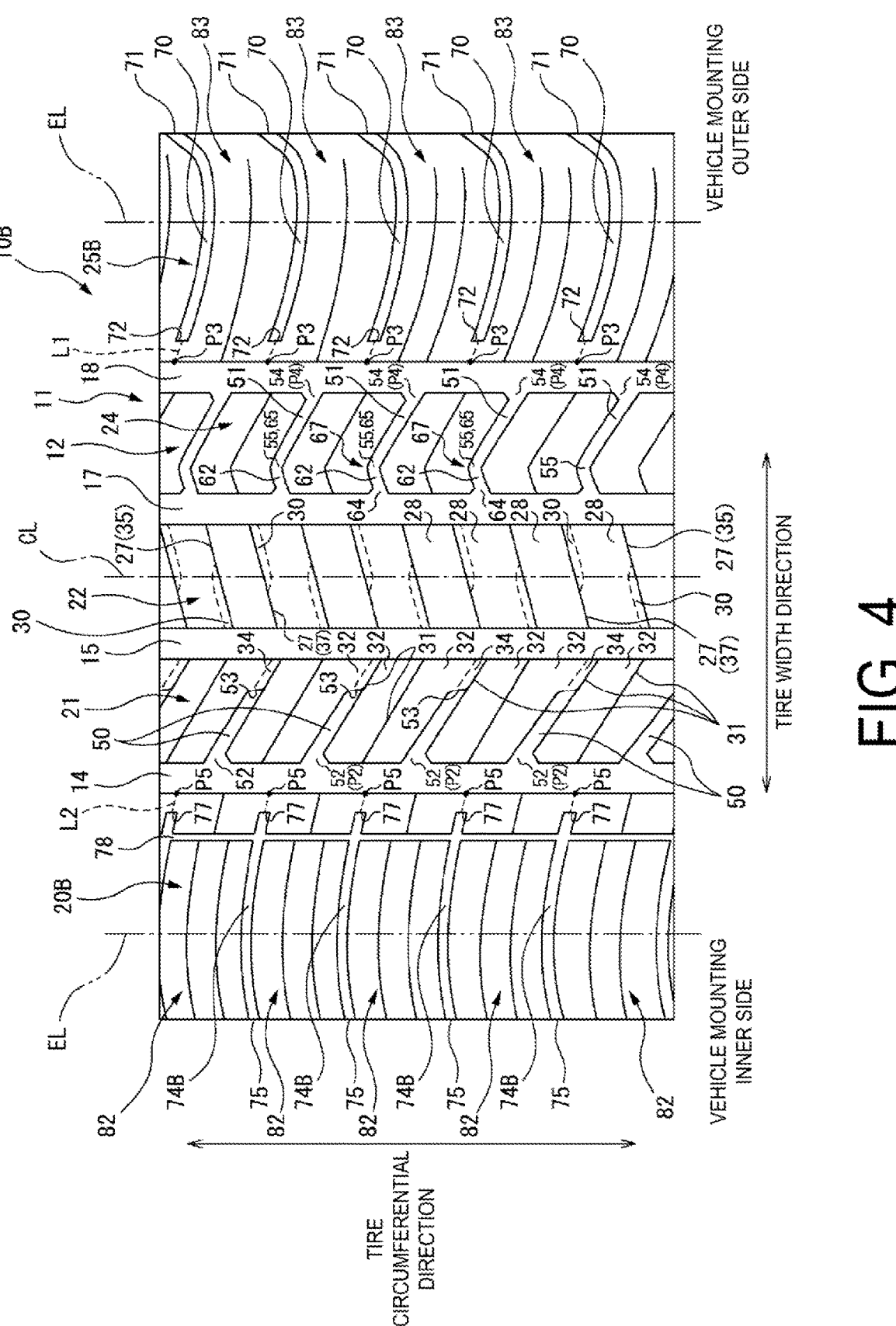
FIG. 4 is a plan view illustrating an example of a tread surface of a tire according to another embodiment.

In Basic Embodiment or an embodiment in which at least any of Additional Embodiments 1 to 5 is added to Basic Embodiment, as illustrated in FIG. 4 in which the same configurations as those in FIG. 1 are denoted by the same reference numerals, a tire 10B preferably includes an inner auxiliary groove 78 extending in the tire circumferential direction and first shoulder grooves 74B extending in the tire width direction in a first shoulder land portion 20B. The inner auxiliary groove 78 has the same depth Ds and groove width Ws as those of the outer auxiliary groove 68 (FIG. 1). For example, an example of a dimension of each groove of the pneumatic tire in which the tire is mounted on a specified rim, inflated to an internal pressure 5% of a specified internal pressure, and in an unloaded state is described. For example, the depth Ds of the inner auxiliary groove 78 of a tire having a size 235/60R18 is expressed by $0.3 \times Dm \leq Ds \leq 0.8 \times Dm$, where Dm is the depth of the four circumferential grooves. The groove width Ws of the inner auxiliary groove 78 is expressed by $0.1 \times Wm \leq Ws \leq 0.4 \times Wm$ with respect to the groove widths Wm of the four circumferential grooves. When the groove widths of the four circumferential grooves differ, an average value of the groove widths of the four circumferential grooves may be used as the groove width Wm. The first shoulder groove 74B has the base end 75 positioned on the outer side in the tire width direction with respect to the ground contact edge on the vehicle mounting inner side and the end 77 disposed between the inner auxiliary groove 78 and the first circumferential groove 14. That is, the first shoulder groove 74B intersects with the inner auxiliary groove 78, terminates within the first shoulder land portion 20B, and does not communicate with the first circumferential groove 14.

By providing the predetermined inner auxiliary groove 78 and first shoulder grooves 74B, the tire 10B increases the groove area of the first shoulder land portion 20B, and by combining the two grooves having different extension directions, snow traction in the turning direction can be ensured. Thus, the tire 10B allows improving snow performance during turning as well as during braking and driving. Although the groove area of the tire 10B increases by the inner auxiliary groove 78 and the first shoulder grooves 74B, noise and vibration performance is not impaired because the first shoulder groove 74B does not communicate with the first circumferential groove 14.

A second shoulder land portion 25B preferably has the second shoulder grooves 70 extending in the tire width direction. The second shoulder groove 70 has the base end 71 positioned on the outer side in the tire width direction with respect to the ground contact edge on the vehicle mounting outer side and the end 72 disposed in the second shoulder land portion 25B on the inner side in the tire width direction with respect to the ground contact edge on the vehicle mounting outer side. That is, the second shoulder groove 70 does not communicate with the fourth circumferential groove 18. By providing the second shoulder grooves 70, the tire 10B can increase the groove area of the second shoulder land portion 25B and improve the snow performance during braking and driving. Since the second shoulder groove 70 does not communicate with the fourth circumferential groove 18, noise and vibration performance is not impaired.

Figure 5:
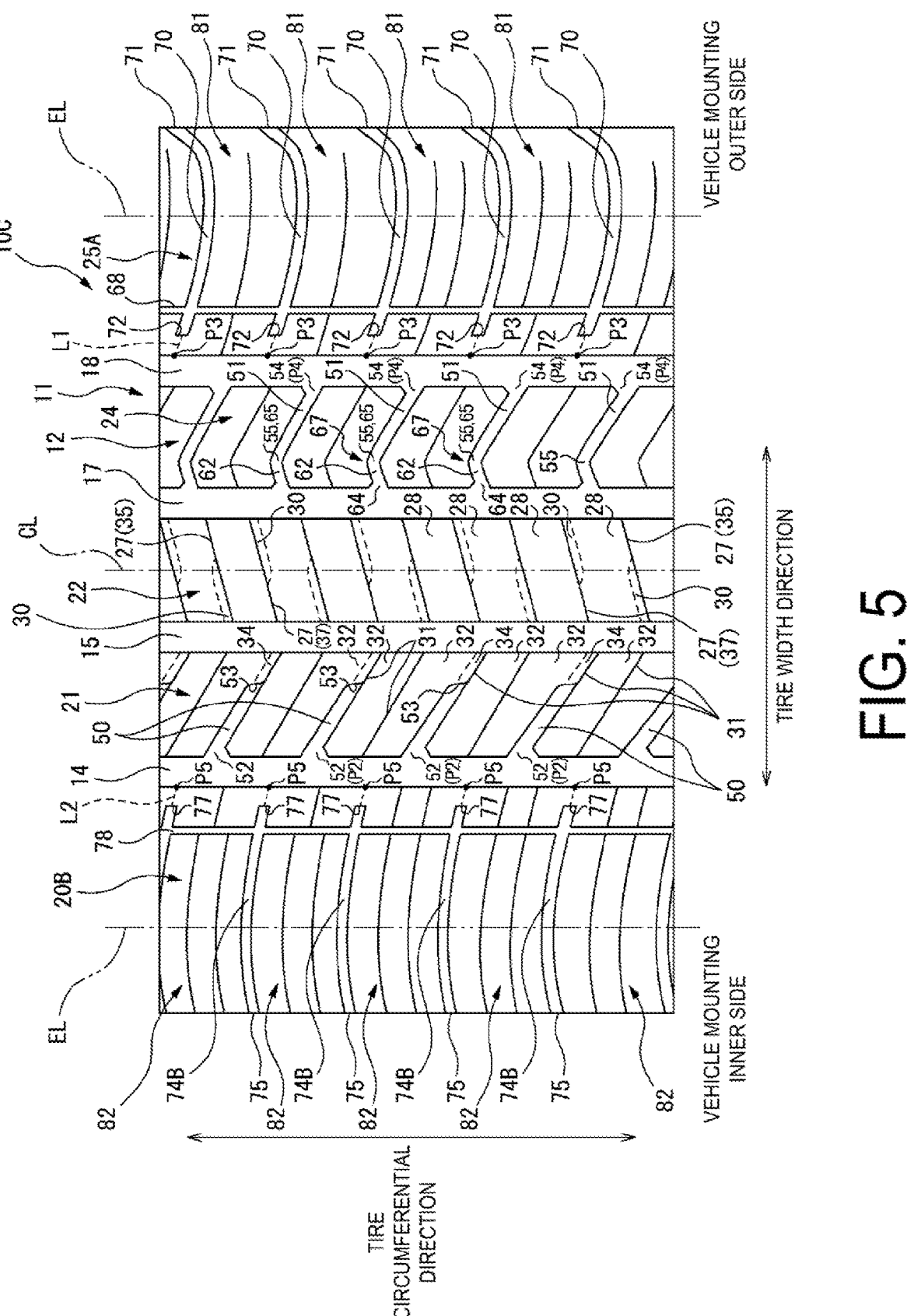
FIG. 5 is a plan view illustrating an example of a tread surface of a tire according to yet another embodiment.

A tire 10C illustrated in FIG. 5 in which the same configurations as those in FIG. 1 are denoted by the same reference numerals includes the first shoulder land portion 20B and the second shoulder land portion 25A. The first shoulder land portion 20B includes the inner auxiliary groove 78 extending in the tire circumferential direction and the first shoulder grooves 74B extending in the tire width direction. The second shoulder land portion 25A includes the outer auxiliary groove 68 extending in the tire circumferential direction and the second shoulder grooves 70 extending in the tire width direction. By providing the predetermined inner auxiliary groove 78, first shoulder grooves 74B, outer auxiliary groove 68, and second shoulder grooves 70, the tire 10C can more reliably ensure the snow traction in the turning direction. Thus, the tire 10C allows further improving snow performance during turning as well as during braking and driving. In the tire 10C, the first shoulder groove 74B does not communicate with the first circumferential groove 14 and the second shoulder groove 70 does not communicate with the fourth circumferential groove 18, and therefore noise and vibration performance is not impaired.

Additional Embodiment 8

In an embodiment in which at least any of Additional Embodiments 1 to 4 is added to Basic Embodiment, as illustrated in FIG. 1, the first shoulder land portion 20A preferably has the first shoulder grooves 74A extending in the tire width direction and the second shoulder land portion 25A preferably has the outer auxiliary groove 68 extending in the tire circumferential direction and the second shoulder grooves 70 extending in the tire width direction.

A position P1 of the end 77 of the first shoulder groove 74A is preferably displaced in the tire circumferential direction from a position P2 of the base end 52 of the first middle groove 50. The position P1 and the position P2 are preferably displaced in the tire circumferential direction to such an extent that respective openings of the first shoulder groove 74A and the first middle groove 50 with respect to the first circumferential groove 14 do not overlap in the tire width direction.

A position P3 where an imaginary line L1 obtained by extending the second shoulder groove 70 toward the vehicle mounting inner side intersects with the fourth circumferential groove 18 is preferably displaced from a position P4 of the base end 54 of the second middle groove 51 in the tire circumferential direction. The imaginary line L1 is a line passing through the center of the groove width of the second shoulder groove 70. The position P3 and the position P4 are preferably displaced in the tire circumferential direction to such an extent that the range in the tire circumferential direction in which the imaginary line L1 intersects with the fourth circumferential groove 18 does not overlap with the opening of the second middle groove 51 with respect to the fourth circumferential groove 18 in the tire width direction. The range in the tire circumferential direction in which the imaginary line L1 intersects with the fourth circumferential groove 18 is a range in the tire circumferential direction having a length equivalent to the groove width of the second shoulder groove 70 around the imaginary line L1. Further, the position P1 and the position P2 are preferably displaced from the position P3 and the position P4 in the tire circumferential direction.

In general, noise is likely to be generated at timing at which an outer edge of a ground contact surface in a tread surface (hereinafter also referred to as a ground contact outer edge) overlaps with a position where a circumferential groove intersects with a lug groove. In the tire 10A illustrated in FIG. 1, the position P1 is displaced from the position P2 in the tire circumferential direction and the position P3 is displaced from the position P4 in the tire circumferential direction. Thus, the position where each of the first shoulder groove 74A and the first middle groove 50 intersects with the first circumferential groove 14 and the position where each of the imaginary line L1 (second shoulder groove 70) and the second middle groove 51 intersects with the fourth circumferential groove 18 do not simultaneously overlap with the ground contact outer edge. In the tire 10A, the positions where the ground contact outer edges overlap with the positions where the circumferential groove intersects with the lug grooves are dispersed to displace timing at which noise is generated, and thus deterioration of noise and vibration performance can be prevented.

Additional Embodiment 9

In an embodiment in which at least any of Additional Embodiments 2 to 4 is added to Basic Embodiment, as illustrated in FIG. 4, the first shoulder land portion 20B preferably includes the inner auxiliary groove 78 extending in the tire circumferential direction and the first shoulder grooves 74B extending in the tire width direction, and the second shoulder land portion 25B preferably includes the second shoulder grooves 70 extending in the tire width direction.

A position P5 where an imaginary line L2 obtained by extending the first shoulder groove 74B toward the vehicle mounting outer side intersects with the first circumferential groove 14 is preferably displaced from the position P2 of the base end 52 of the first middle groove 50 in the tire circumferential direction. The imaginary line L2 is a line passing through the center of the groove width of the first shoulder groove 74B.

The position P5 and the position P2 are preferably displaced in the tire circumferential direction to such an extent that the range in the tire circumferential direction in which the imaginary line L2 intersects with the first circumferential groove 14 does not overlap with the opening of the first middle groove 50 with respect to the first circumferential groove 14 in the tire width direction. The range in the tire circumferential direction in which the imaginary line L2 intersects with the first circumferential groove 14 is a range in the tire circumferential direction having a length equivalent to the groove width of the first shoulder groove 74B around the imaginary line L2. Further, the position P3 where the imaginary line L1 obtained by extending the second shoulder groove 70 toward the vehicle mounting inner side intersects with the fourth circumferential groove 18 is preferably displaced from the position P4 of the base end 54 of the second middle groove 51 in the tire circumferential direction. Further, the position P5 and the position P2 are preferably displaced from the position P3 and the position P4 in the tire circumferential direction.

In the tire 10B illustrated in FIG. 4, the position P5 is displaced from the position P2 in the tire circumferential direction and the position P3 is displaced from the position P4 in the tire circumferential direction. Thus, the position where each of the imaginary line L2 (first shoulder groove 74B) and the first middle groove 50 intersects with the first circumferential groove 14 and the position where each of the imaginary line L1 (second shoulder groove 70) and the second middle groove 51 intersects with the fourth circumferential groove 18 do not simultaneously overlap with the ground contact outer edge. In the tire 10B, the positions where the ground contact outer edges overlap with the positions where the circumferential groove intersects with the lug grooves are dispersed to displace timing at which noise is generated, and thus deterioration of noise and vibration performance can be prevented.

In the tire 10C illustrated in FIG. 5 as well, the position P5 is displaced from the position P2 in the tire circumferential direction and the position P3 is displaced from the position P4 in the tire circumferential direction, and therefore the effect similar to the tire 10B can be obtained.

Additional Embodiment 10

In an embodiment in which Additional Embodiment 8 or 9 is added to Basic Embodiment, as illustrated in FIG. 1 (FIGS. 4 and 5), it is preferable that the groove width of the first middle groove 50 is wider than the groove width of the first shoulder groove 74A (74B), and the groove width of the second middle groove 51 is wider than the groove width of the second shoulder groove 70. The groove width of the first middle groove 50 may be the same as or differ from the groove width of the second middle groove 51. The groove width of the first shoulder groove 74A (74B) may be the same as or differ from the groove 20) width of the second shoulder groove 70. Further widening the groove widths of the first middle groove 50 and the second middle groove 51 increases the groove areas of the first middle land portion 21 and the second middle land portion 24 and can improve the snow performance during braking and driving. Further narrowing the groove widths of the first shoulder groove 74A (74B) and the second shoulder groove 70 absorbs a part of pattern noise by the first shoulder groove 74A (74B) and the second shoulder groove 70. Therefore, the tire 10A can reduce pattern noise emitted to the outside of the vehicle and prevent the deterioration of noise and vibration performance. When the groove widths of the first middle groove 50 and the second middle groove 51 are Wsec and the groove widths of the first shoulder groove 74A (74B) and the second shoulder groove 70 are Wsh, a groove width ratio (Wsec/Wsh) may be, for example, $1.1 \leq (Wsec/Wsh) \leq 1.8$.

Additional Embodiment 11

In an embodiment in which at least any of Additional Embodiments 8 to 10 is added to Basic Embodiment, as illustrated in FIG. 1 (FIGS. 4 and 5), in a region from the inner side in the tire width direction of the first shoulder land portion 20A (20B) to the ground contact edge, the first shoulder groove 74A (74B) is preferably inclined in the same direction as the first middle groove 50 in the circumferential direction toward the outer side in the tire width direction, and in a region from the inner side in the tire width direction of the second shoulder land portion 25A (25B) to the ground contact edge, the second shoulder groove 70 is preferably inclined in the same direction as the second middle groove 51 in the circumferential direction toward the outer side in the tire width direction. In the tire 10A (10B, 10C), the positions where the ground contact outer edges overlap with the positions where the circumferential groove intersects with the lug grooves are dispersed to displace timing at which noise is generated more reliably, and thus the deterioration of noise and vibration performance can be prevented.

Additional Embodiment 12

In an embodiment in which at least any of Additional Embodiments 8 to 11 is added to Basic Embodiment, as illustrated in FIG. 1 (FIGS. 4 and 5), the angle between the first middle groove 50 and the tire width direction is preferably greater than the angle between the first shoulder groove 74A (74B) and the tire width direction in the region from the inner side in the tire width direction of the first shoulder land portion 20A (20B) to the ground contact edge, and the angle between the second middle groove 51 and the tire width direction is preferably greater than the angle between the second shoulder groove 70 and the tire width direction in the region from the inner side in the tire width direction of the second shoulder land portion 25A (25B) to the ground contact edge. The first shoulder groove 74A (74B) and the second shoulder groove 70 are preferably formed at angles closer to the tire width direction. When the angles of the first shoulder groove 74A (74B) and the second shoulder groove 70 are closer to the tire width direction, a block 80, 82 defined by the first shoulder groove 74A (74B) of the first shoulder land portion 20A (20B) and the first circumferential groove 14 or the inner auxiliary groove 78 and a block 81, 83 defined by the second shoulder grooves 70 of the 30) second shoulder land portion 25A (25B) and the outer auxiliary groove 68 or the fourth circumferential groove 18 have a shape close to a rectangle in a tire plan view. When the angles between the first middle groove 50 and the second middle groove 51 and the tire width direction are further large, the block defined by the first middle groove 50 of the first middle land portion 21 and the first circumferential groove 14 and the block defined by the second middle groove 51 of the second middle land portion 24 and the fourth circumferential groove 18 have a shape close to a parallelogram in the tire plan view.

In the tire 10A (10B, 10C), by forming the first shoulder groove 74A (74B) and the second shoulder groove 70 at the angles closer to the tire width direction, the rigidity of the first shoulder land portion 20A (20B) and the second shoulder land portion 25A (25B) against shearing force in the tire circumferential direction is increased, and therefore straight-line performance can be improved. In the tire 10A (10B, 10C), by increasing the angle between the first middle groove 50 and the second middle groove 51 and the tire width direction, the rigidity of the first middle land portion 21 and the second middle land portion 24 against the shear force in the tire circumferential direction is reduced, and thus the deterioration of noise and vibration performance can be prevented.

The tire 10A (10B, 10C) illustrated in FIG. 1 (FIGS. 4 and 5) preferably has sipes extending in the tire width direction in the blocks 80, 82. The tire 10A (10B, 10C) includes a case of the blocks 80, 82 having one sipes, a case of the blocks 80, 82 having two sipes, and a case of the blocks 80, 82 having one sipes and the blocks 80, 82 having two sipes.

The tire 10A (10B, 10C) illustrated in FIG. 1 (FIGS. 4 and 5) preferably has sipes extending in the tire width direction in the blocks 81, 83. The tire 10A (10B, 10C) includes a case of the blocks 81, 83 having one sipes, a case of the blocks 81, 83 having two sipes, and a case of the blocks 81, 83 having one sipes and the blocks 81, 83 having two sipes.

EXAMPLES

Tires according to Examples 1 to 19 and a tire of Conventional Example were manufactured having a tire size 235/60R18 103H were manufactured. The detailed conditions of these tires are as shown in Table 1 and Table 2 below.

Sample

The tire according to Example includes a first shoulder land portion, a first circumferential groove, a first middle land portion, a second circumferential groove, a center land portion, a third circumferential groove, a second middle land portion, a fourth circumferential groove, and a second shoulder land portion in this order from the vehicle mounting inner side. A center sipe and a middle sipe were formed in the center land portion and the first middle land portion, respectively. The center sipe and the middle sipe each have a chamfered portion. A first middle groove was formed in the first middle land portion, a second middle groove was formed in the second middle land portion, a first shoulder groove was formed in the first shoulder land portion, and a second shoulder groove was formed in the second shoulder land portion.

In the columns of "Chamfered portions of center sipes" in Tables 1 and 2, "Identical" indicates that the center sipes are only first center sipes and the directions of the chamfered portions with respect to the tire circumferential direction are the same. "Alternate" indicates that the center sipes include the first center sipes and a second center sipes and the directions of the chamfered portions with respect to the tire circumferential direction are alternate.

In the columns of "First middle groove" in Tables 1 and 2, "Communicating" indicates a case where the first middle groove communicates with the second circumferential groove. "Not communicating" indicates a case where the first middle groove does not communicate with the second circumferential groove.

The value indicated in "Tire width direction proportion" of the first middle land portion indicates a proportion of the length of the first middle groove in the tire width direction occupying the length of the first middle land portion in the tire width direction. When "Tire width direction proportion" is expressed as "100%" and "First middle groove" is expressed as "Communicating," this indicates that the first middle groove communicates with the first circumferential groove and the second circumferential groove. When "Tire width direction proportion" is expressed as "60%" and "First middle groove" is expressed as "Communicating." this indicates that the first middle groove communicates with the first circumferential groove and communicates with the second circumferential groove via the middle sipe. When "Tire width direction proportion" is expressed as "60%" and "First middle groove" is expressed as "Not communicating," this indicates that the base end of the first middle groove communicates with the first circumferential groove and the end of the first middle groove is disposed in the first middle land portion and does not communicate with the second circumferential groove.

In the column of "Presence of communicating portion," "Yes" indicates a case where the communicating portion is formed in the second middle land portion, that is, a case where the second middle groove communicates with the third middle groove via the communicating portion, and "No" indicates a case where the communicating portion is not formed. The value indicated in "Tire width direction proportion" of the second middle land portion indicates a proportion of the length of the second middle groove occupying the length of the second middle land portion in the tire width direction. When "Communicating portion" is "No" and "Tire width direction proportion" is 100%, this indicates that the second middle groove communicates with the third circumferential groove and the fourth circumferential groove. When "Communicating portion" is "No" and "Tire width direction proportion" is 60%, this indicates that although the second middle groove communicates with the fourth circumferential groove, it terminates within the second middle land portion and does not communicate with the third circumferential groove. When "Communicating portion" is "Yes" and "Tire width direction proportion" is 100%, this indicates that the second middle groove communicates with the third middle groove via the communicating portion and communicates with the third circumferential groove and the fourth circumferential groove.

In the column of "Inner auxiliary groove," "Yes" indicates a case where the inner auxiliary groove is provided in the first shoulder land portion, and "No" indicates a case where the inner auxiliary groove is not provided in the first shoulder land portion. In the column of "First shoulder groove," "Communicating" indicates a case where the first shoulder groove communicates with the first circumferential groove, and "Not communicating" indicates a case where the first shoulder groove does not communicate with the first circumferential groove. In the column of "First shoulder groove," "Across and not communicating" indicates a case where the first shoulder groove intersects with the inner auxiliary groove, terminates within the first shoulder land portion, and does not communicate with the first circumferential groove.

In the column of "Outer auxiliary groove," "Yes" indicates a case where the outer auxiliary groove is provided in the second shoulder land portion, and "No" indicates a case where the outer auxiliary groove is not provided in the second shoulder land portion. In the column of "Second shoulder groove," "Communicating" indicates a case where the second shoulder groove communicates with the fourth circumferential groove, and "Not communicating" indicates a case where the second shoulder groove does not communicate with the fourth circumferential groove. In the column of "Second shoulder groove," "Across and not communicating" indicates a case where the second shoulder groove intersects with the outer auxiliary groove, terminates within the second shoulder land portion, and does not communicate with the fourth circumferential groove.

In the column of "Positions of P1/P2 (P5/P2) and P3/P4" in Tables 1 and 2, "Match" indicates a case where the respective position P1 of the end of the first shoulder groove (or the position P5 where the imaginary line obtained by extending the first shoulder groove toward the vehicle mounting outer side intersects with the first circumferential groove), position P2 of the base end of the first middle groove, position P3 where the imaginary line obtained by extending the second shoulder groove toward the vehicle mounting inner side intersects with the fourth circumferential groove, and position P4 of the base end of the second middle groove are matched in the tire circumferential direction, and "Mismatch" indicates a case where they are displaced in the tire circumferential direction.

The values in the columns of "Groove width ratio" in Tables 1 and 2 indicate a ratio (Wsec/Wsh) when the groove widths of the first middle groove and the second middle groove are Wsec and the groove widths of the first shoulder groove and the second shoulder groove are Wsh.

In the columns of "Direction of inclination of grooves" in Tables 1 and 2, "Mismatch" indicates a case where the first shoulder groove and the first middle groove, and the second shoulder groove and the second middle groove are each inclined in different directions in the tire circumferential direction, and "Match" indicates a case where they are inclined in the same direction in the tire circumferential direction.

The tires according to Examples 1 to 19 and the tire according to Conventional Example thus manufactured were mounted on 18×7.0 J rims made of aluminum at 240 kPa, each test tire was mounted on a four wheel drive test vehicle (displacement: 2000 cc), and snow performance and noise and vibration performance were evaluated in accordance with the following points.

In the tire according to Conventional Example, a chamfered portion is not provided in the center sipe or the middle sipe.

Snow Performance

Snow performance was evaluated by a lateral acceleration performance index and a braking performance index. In the lateral acceleration performance index, the test vehicle lapped five times on a test course of snow-covered road surfaces having a radius of 7 m at differing speeds, lateral acceleration was calculated from the lap time of each lap, and the average value of the lateral acceleration was expressed as an index value with Conventional Example assigned the value of 100. A larger index value indicates a superior lateral acceleration performance index. The braking performance index was expressed as an index value derived from a braking distance at a speed of 30 km/h on snow-covered road surfaces. The evaluation was expressed as index values, with Conventional Example assigned the value of 100. Larger values indicate superior braking performance.

Noise and Vibration Performance

For noise and vibration performance, sensory evaluation of cabin noise when the test vehicle traveled at a speed of 60 km/h on a test course formed of a paved road surface was performed. The evaluation results were expressed as index values, with Conventional Example assigned the value of 100. The larger values indicate low sound pressure of cabin noise and superior noise performance.

TABLE 1-1

| | | Conventional Example | Example 1 | Example 2 |
|---|---|---|---|---|
| Chamfered portions of center sipes | | — | Identical | Alternate |
| First middle land portion | First middle groove | Not communicating | Communicating | Communicating |
| | Tire width direction proportion | 60% | 100% | 100% |
| Second middle land portion | Presence of communicating portion | Yes | No | No |
| | Tire width direction proportion | 100% | 100% | 100% |
| First shoulder land portion | Inner auxiliary groove Yes/No | No | No | No |
| | First shoulder groove | Communicating | Not communicating | Not communicating |
| Second shoulder land portion | Outer auxiliary groove Yes/No | No | No | No |
| | Second shoulder groove | Communicating | Communicating | Not communicating |
| Positions of P1/P2 (P5/P2) and P3/P4 | | Match | Match | Match |
| Groove width ratio | Wsec/Wsh | 1.3 | 0.8 | 0.8 |
| Direction of inclination of grooves | | Match | Mismatch | Mismatch |
| Snow performance | Lateral acceleration performance index | 100 | 100 | 100 |
| | Braking performance index | 100 | 103 | 106 |
| Noise and vibration performance | Driver sensory evaluation score | 100 | 100 | 100 |

TABLE 1-2

| | | Example 3 | Example 4 | Example 5 | Example 6 |
|---|---|---|---|---|---|
| Chamfered portions of center sipes | | Alternate | Alternate | Alternate | Alternate |
| First middle land portion | First middle groove | Not communicating | Communicating | Communicating | Communicating |
| | Tire width direction proportion | 60% | 60% | 60% | 60% |
| Second middle land portion | Presence of communicating portion | No | No | Yes | Yes |
| | Tire width direction proportion | 60% | 60% | 100% | 100% |
| First shoulder land | Inner auxiliary groove Yes/No | No | No | No | No |

TABLE 1-2-continued

| | | Example 3 | Example 4 | Example 5 | Example 6 |
|---|---|---|---|---|---|
| portion | First shoulder groove | Not communicating | Not communicating | Not communicating | Not communicating |
| Second shoulder land portion | Outer auxiliary groove   Yes/No | No | No | No | Yes |
| portion | Second shoulder groove | Not communicating | Not communicating | Not communicating | Across and not communicating |
| Positions of P1/P2 (P5/P2) and P3/P4 | | Match | Match | Match | Match |
| Groove width ratio | Wsec/Wsh | 0.8 | 0.8 | 0.8 | 0.8 |
| Direction of inclination of grooves | | Mismatch | Mismatch | Mismatch | Mismatch |
| Snow performance | Lateral acceleration performance index | 100 | 100 | 103 | 107 |
| | Braking performance index | 106 | 108 | 110 | 110 |
| Noise and vibration performance | Driver sensory evaluation score | 103 | 103 | 103 | 103 |

TABLE 1-3

| | | Example 7 | Example 8 | Example 9 |
|---|---|---|---|---|
| Chamfered portions of center sipes | | Alternate | Alternate | Alternate |
| First middle land portion | First middle groove | Communicating | Communicating | Communicating |
| | Tire width direction proportion | 60% | 60% | 60% |
| Second middle land portion | Presence of communicating portion | Yes | Yes | Yes |
| | Tire width direction proportion | 100% | 100% | 100% |
| First shoulder land portion | Inner auxiliary groove   Yes/No | No | No | No |
| | First shoulder groove | Communicating | Communicating | Communicating |
| Second shoulder land portion | Outer auxiliary groove   Yes/No | Yes | Yes | Yes |
| | Second shoulder groove | Across and not communicating | Across and not communicating | Across and not communicating |
| Positions of P1/P2 (P5/P2) and P3/P4 | | Match | Mismatch | Mismatch |
| Groove width ratio | Wsec/Wsh | 0.8 | 0.8 | 1.3 |
| Direction of inclination of grooves | | Mismatch | Mismatch | Mismatch |
| Snow performance | Lateral acceleration performance index | 107 | 107 | 107 |
| | Braking performance index | 112 | 112 | 112 |
| Noise and vibration performance | Driver sensory evaluation score | 103 | 105 | 107 |

TABLE 2-1

| | | Example 10 | Example 11 | Example 12 | Example 13 |
|---|---|---|---|---|---|
| Chamfered portions of center sipes | | Alternate | Alternate | Alternate | Alternate |
| First middle land portion | First middle groove | Communicating | Communicating | Communicating | Communicating |
| | Tire width direction proportion | 60% | 60% | 60% | 60% |
| Second middle land portion | Presence of communicating portion | Yes | Yes | Yes | Yes |
| | Tire width direction proportion | 100% | 100% | 100% | 100% |
| First shoulder land | Inner auxiliary groove   Yes/No | No | No | Yes | Yes |

TABLE 2-1-continued

|  |  | Example 10 | Example 11 | Example 12 | Example 13 |
|---|---|---|---|---|---|
| portion | First shoulder groove | Communicating | Communicating | Across and not communicating | Across and not communicating |
| Second shoulder land portion | Outer auxiliary groove Yes/No | Yes | Yes | No | Yes |
| portion | Second shoulder groove | Across and not communicating | Across and not communicating | Not communicating | Across and not communicating |
| Positions of P1/P2 (P5/P2) and P3/P4 |  | Mismatch | Mismatch | Match | Match |
| Groove width ratio | Wsec/Wsh | 1.3 | 1.3 | 0.8 | 0.8 |
| Direction of inclination of grooves |  | Match | Match | Mismatch | Mismatch |
| Snow performance | Lateral acceleration performance index | 107 | 107 | 107 | 111 |
|  | Braking performance index | 112 | 112 | 110 | 108 |
| Noise and vibration performance | Driver sensory evaluation score | 110 | 110 | 103 | 103 |

TABLE 2-2

|  |  | Example 14 | Example 15 | Example 16 |
|---|---|---|---|---|
| Chamfered portions of center sipes |  | Alternate | Alternate | Alternate |
| First middle land portion | First middle groove | Communicating | Communicating | Communicating |
|  | Tire width direction proportion | 60% | 60% | 60% |
| Second middle land portion | Presence of communicating portion | Yes | Yes | Yes |
|  | Tire width direction proportion | 100% | 100% | 100% |
| First shoulder land portion | Inner auxiliary groove Yes/No | Yes | Yes | Yes |
|  | First shoulder groove | Across and not communicating | Across and not communicating | Across and not communicating |
| Second shoulder land portion | Outer auxiliary groove Yes/No | No | Yes | No |
|  | Second shoulder groove | Not communicating | Across and not communicating | Not communicating |
| Positions of P1/P2 (P5/P2) and P3/P4 |  | Mismatch | Mismatch | Mismatch |
| Groove width ratio | Wsec/Wsh | 0.8 | 0.8 | 1.3 |
| Direction of inclination of grooves |  | Mismatch | Mismatch | Mismatch |
| Snow performance | Lateral acceleration performance index | 107 | 111 | 107 |
|  | Braking performance index | 110 | 108 | 110 |
| Noise and vibration performance | Driver sensory evaluation score | 105 | 105 | 107 |

TABLE 2-3

|  |  | Example 17 | Example 18 | Example 19 |
|---|---|---|---|---|
| Chamfered portions of center sipes |  | Alternate | Alternate | Alternate |
| First middle land portion | First middle groove | Communicating | Communicating | Communicating |
|  | Tire width direction proportion | 60% | 60% | 60% |
| Second middle land portion | Presence of communicating portion | Yes | Yes | Yes |
|  | Tire width direction proportion | 100% | 100% | 100% |
|  | Inner auxiliary groove Yes/No | Yes | Yes | Yes |
| First shoulder land portion | First shoulder groove | Across and not communicating | Across and not communicating | Across and not communicating |

TABLE 2-3-continued

|  |  |  | Example 17 | Example 18 | Example 19 |
|---|---|---|---|---|---|
| Second shoulder land portion | Outer auxiliary groove | Yes/No | Yes | No | Yes |
|  | Second shoulder groove |  | Across and not communicating | Not communicating | Across and not communicating |
| Positions of P1/P2 (P5/P2) and P3/P4 |  |  | Mismatch | Mismatch | Mismatch |
| Groove width ratio | Wsec/Wsh |  | 1.3 | 1.3 | 1.3 |
| Direction of inclination of grooves |  |  | Mismatch | Match | Match |
| Snow performance | Lateral acceleration performance index |  | 111 | 107 | 111 |
|  | Braking performance index |  | 108 | 110 | 108 |
| Noise and vibration performance | Driver sensory evaluation score |  | 107 | 110 | 110 |

Results

Through comparison between Examples 1 to 19 and Conventional Example, it was found that providing the chamfered portions in the center sipes and the middle sipes allowed improving braking performance without deteriorating noise and vibration performance. Through comparison between Example 1 and Examples 2 to 19, it was confirmed that braking performance was further improved by alternately disposing the first center sipes and the second center sipes as the center sipes. Through comparison between Examples 1 and 2 and Examples 3 to 19, it was found that noise and vibration performance was improved by the end of the first middle groove terminating at a position closer to the second circumferential groove than the center of the first middle land portion in the tire width direction, and the end of the second middle groove terminating at a position closer to the third circumferential groove than the center of the second middle land portion in the tire width direction. Through comparison between Examples 1 to 3 and Examples 4 to 19, it was confirmed that the middle sipe interposed between the first middle groove and the second circumferential groove improved braking performance while preventing the deterioration of noise and vibration performance. Through comparison between Examples 1 to 4 and Examples 5 to 19, it was found that providing the third middle groove and the communicating portion improved snow performance while preventing the deterioration of noise and vibration performance. Through comparison between Examples 1 to 5 and Examples 6 to 11, it was able to be confirmed that providing the outer auxiliary groove improved lateral acceleration performance. Through comparison between Examples 1 to 6 and Examples 7 to 11, it was found that braking performance was improved by the first shoulder groove communicating with the first circumferential groove. Through comparison between Examples 1 to 5 and Examples 12, 14, 16, and 18, it was able to be confirmed that providing the inner auxiliary groove improved lateral acceleration performance. Through comparison between Examples 6 to 11, 12, 14, 16, and 18 and Examples 13, 15, 17, and 19, it was able to be confirmed that providing the outer auxiliary groove and the inner auxiliary groove further improved lateral acceleration performance. Through comparison between Examples 1 to 7 and Examples 8 to 11 and 14 to 19, it was confirmed that noise and vibration performance was improved when the respective position P1 of the end of the first shoulder groove (or the position P5 where the imaginary line obtained by extending the first shoulder groove toward the vehicle mounting outer side intersects with the first circumferential groove), position P2 of the base end of the first middle groove, position P3 where the imaginary line obtained by extending the second shoulder groove toward the vehicle mounting inner side intersects with the fourth circumferential groove, and position P4 of the base end of the second middle groove were displaced in the tire circumferential direction. Through comparison between Examples 1 to 8 and Examples 9 to 11 and 16 to 19, it was found that further narrowing the groove widths of the first shoulder groove and the second shoulder groove improved noise and vibration performance. Through comparison between Examples 1 to 9 and Examples 10, 11, 18, and 19, it was found that noise and vibration performance was further improved by the first shoulder grooves being inclined in the same direction as the first middle grooves and the second shoulder grooves being inclined in the same direction as the second middle grooves in the tire circumferential direction.

The invention claimed is:

1. A tire having a pattern asymmetric with respect to a tire equatorial plane in a tire plan view, the tire comprising:
   a first shoulder land portion, a first circumferential groove, a first middle land portion, a second circumferential groove, a center land portion, a third circumferential groove, a second middle land portion, a fourth circumferential groove, and a second shoulder land portion in this order from a vehicle mounting inner side,
   the center land portion comprising a plurality of center sipes extending in a tire width direction,
   at least one of the plurality of center sipes comprising a chamfered portion at at least one edge portion in a tire circumferential direction,
   the first middle land portion comprising a plurality of middle sipes extending in the tire width direction, and
   at least one of the plurality of middle sipes comprising a chamfered portion at at least one edge portion in the tire circumferential direction; wherein
   the center sipe comprises:
   a first center sipe comprising the chamfered portion at only one edge portion in the tire circumferential direction with no other chamfered portions; and
   a second center sipe comprising the chamfered portion at only the other edge portion in the tire circumferential direction with no other chamfered portions,
   the first center sipes and the second center sipes are alternately disposed in the tire circumferential direction.

2. The tire according to claim 1, wherein
the chamfered portion of the first center sipe comprises: a
base end communicating with the second circumferential groove; and
an end disposed within the center land portion, and
the chamfered portion of the second center sipe comprises:
a base end communicating with the third circumferential groove; and
an end disposed within the center land portion.

3. The tire according to claim 1, wherein
the first middle land portion comprises a first middle groove extending in the tire width direction,
the first middle groove comprises:
a base end communicating with the first circumferential groove; and
an end disposed at a position closer to the second circumferential groove than a center of the first middle land portion in the tire width direction,
the second middle land portion comprises a second middle groove extending in the tire width direction, and
the second middle groove comprises:
a base end communicating with the fourth circumferential groove; and
an end disposed at a position closer to the third circumferential groove than a center of the second middle land portion in the tire width direction.

4. The tire according to claim 3, wherein
at least one base end of the plurality of middle sipes communicates with the end of the first middle groove, and at least one end of the plurality of middle sipes communicates with the second circumferential groove.

5. The tire according to claim 3, wherein
the second middle land portion comprises a third middle groove communicating with the end of the second middle groove,
the second middle groove is inclined to one side in the tire circumferential direction with respect to the tire width direction,
the third middle groove has a base end communicating with the end of the second middle groove, and the end of the third middle groove communicates with the third circumferential groove, and
the end of the second middle groove and the base end of the third middle groove form a communicating portion protruding to one side or the other side in the tire circumferential direction.

6. The tire according to claim 3, wherein
the first shoulder land portion comprises a first shoulder groove extending in the tire width direction,
the first shoulder groove comprises:
a base end positioned on an outer side in the tire width direction with respect to a ground contact edge on a vehicle mounting inner side; and
an end communicating with the first circumferential groove,
the second shoulder land portion comprises:
an outer auxiliary groove extending in the tire circumferential direction; and
a second shoulder groove intersecting with the outer auxiliary groove,
the second shoulder groove comprises:
a base end positioned on the outer side in the tire width direction with respect to the ground contact edge on a vehicle mounting outer side; and
an end disposed between the outer auxiliary groove and the fourth circumferential groove, a position of the end of the first shoulder groove is displaced from a position of the base end of the first middle groove in the tire circumferential direction, and
a position where an imaginary line obtained by extending the second shoulder groove toward the vehicle mounting inner side intersects with the fourth circumferential groove is displaced from a position of the base end of the second middle groove in the tire circumferential direction.

7. The tire according to claim 6, wherein
the first middle groove has a groove width wider than a groove width of the first shoulder groove, and
the second middle groove has a groove width wider than a groove width of the second shoulder groove.

8. The tire according to claim 6, wherein
in a region from the inner side of the first shoulder land portion in the tire width direction to the ground contact edge, the first shoulder groove is inclined to the outer side in the tire width direction in a same direction as the first middle groove in the tire circumferential direction, and
in a region from the inner side of the second shoulder land portion in the tire width direction to the ground contact edge, the second shoulder groove is inclined to the outer side in the tire width direction in a same direction as the second middle groove in the tire circumferential direction.

9. The tire according to claim 6, wherein
an angle between the first middle groove and the tire width direction is larger than an angle between the first shoulder groove and the tire width direction in a region from the inner side of the first shoulder land portion in the tire width direction to the ground contact edge, and
an angle between the second middle groove and the tire width direction is larger than an angle between the second shoulder groove and the tire width direction in a region from the inner side of the second shoulder land portion in the tire width direction to the ground contact edge.

10. The tire according to claim 3, wherein
the first shoulder land portion comprises:
an inner auxiliary groove extending in the tire circumferential direction; and
a first shoulder groove intersecting with the inner auxiliary groove,
the first shoulder groove comprises:
a base end positioned on an outer side in the tire width direction with respect to a ground contact edge on a vehicle mounting inner side; and
an end disposed between the inner auxiliary groove and the first circumferential groove,
the second shoulder land portion comprises a second shoulder groove extending in the tire width direction,
the second shoulder groove comprises:
a base end positioned on the outer side in the tire width direction with respect to the ground contact edge on the vehicle mounting inner side; and
an end disposed within the second shoulder land portion,
a position where an imaginary line obtained by extending the first shoulder groove toward a vehicle mounting outer side intersects with the first circumferential groove is displaced from a position of the base end of the first middle groove in the tire circumferential direction, and
a position where an imaginary line obtained by extending the second shoulder groove toward the vehicle mounting inner side intersects with the fourth circumferential groove is displaced from a position of the base end of the second middle groove in the tire circumferential direction.

11. The tire according to claim 3, wherein the first shoulder land portion comprises:

an inner auxiliary groove extending in the tire circumferential direction; and a first shoulder groove intersecting with the inner auxiliary groove, the first shoulder groove comprises:

a base end positioned on an outer side in the tire width direction with respect to a ground contact edge on a vehicle mounting inner side; and an end disposed between the inner auxiliary groove and the first circumferential groove, the second shoulder land portion comprises:

an outer auxiliary groove extending in the tire circumferential direction; and a second shoulder groove intersecting with the outer auxiliary groove, the second shoulder groove comprises:

a base end positioned on the outer side in the tire width direction with respect to the ground contact edge on a vehicle mounting outer side; and an end disposed between the outer auxiliary groove and the fourth circumferential groove, a position where an imaginary line obtained by extending the first shoulder groove toward the vehicle mounting outer side intersects with the first circumferential groove is displaced from a position of the base end of the first middle groove in the tire circumferential direction, and a position where an imaginary line obtained by extending the second shoulder groove toward the vehicle mounting inner side intersects with the fourth circumferential groove is displaced from a position of the base end of the second middle groove in the tire circumferential direction.

12. The tire according to claim 1, wherein the second shoulder land portion comprises:

an outer auxiliary groove extending in the tire circumferential direction; and a second shoulder groove intersecting with the outer auxiliary groove, and the second shoulder groove comprises:

a base end positioned on an outer side in the tire width direction with respect to a ground contact edge on a vehicle mounting outer side; and an end disposed between the outer auxiliary groove and the fourth circumferential groove.

13. The tire according to claim 1, wherein the first shoulder land portion comprises a first shoulder groove extending in the tire width direction, and the first shoulder groove comprises:

a base end positioned on an outer side in the tire width direction with respect to a ground contact edge on a vehicle mounting inner side; and an end communicating with the first circumferential groove.

14. The tire according to claim 1, wherein the first shoulder land portion comprises:

an inner auxiliary groove extending in the tire circumferential direction; and a first shoulder groove intersecting with the inner auxiliary groove, and the first shoulder groove comprises:

a base end positioned on an outer side in the tire width direction with respect to a ground contact edge on a vehicle mounting inner side; and an end disposed between the inner auxiliary groove and the first circumferential groove.

* * * * *